UNITED STATES PATENT OFFICE.

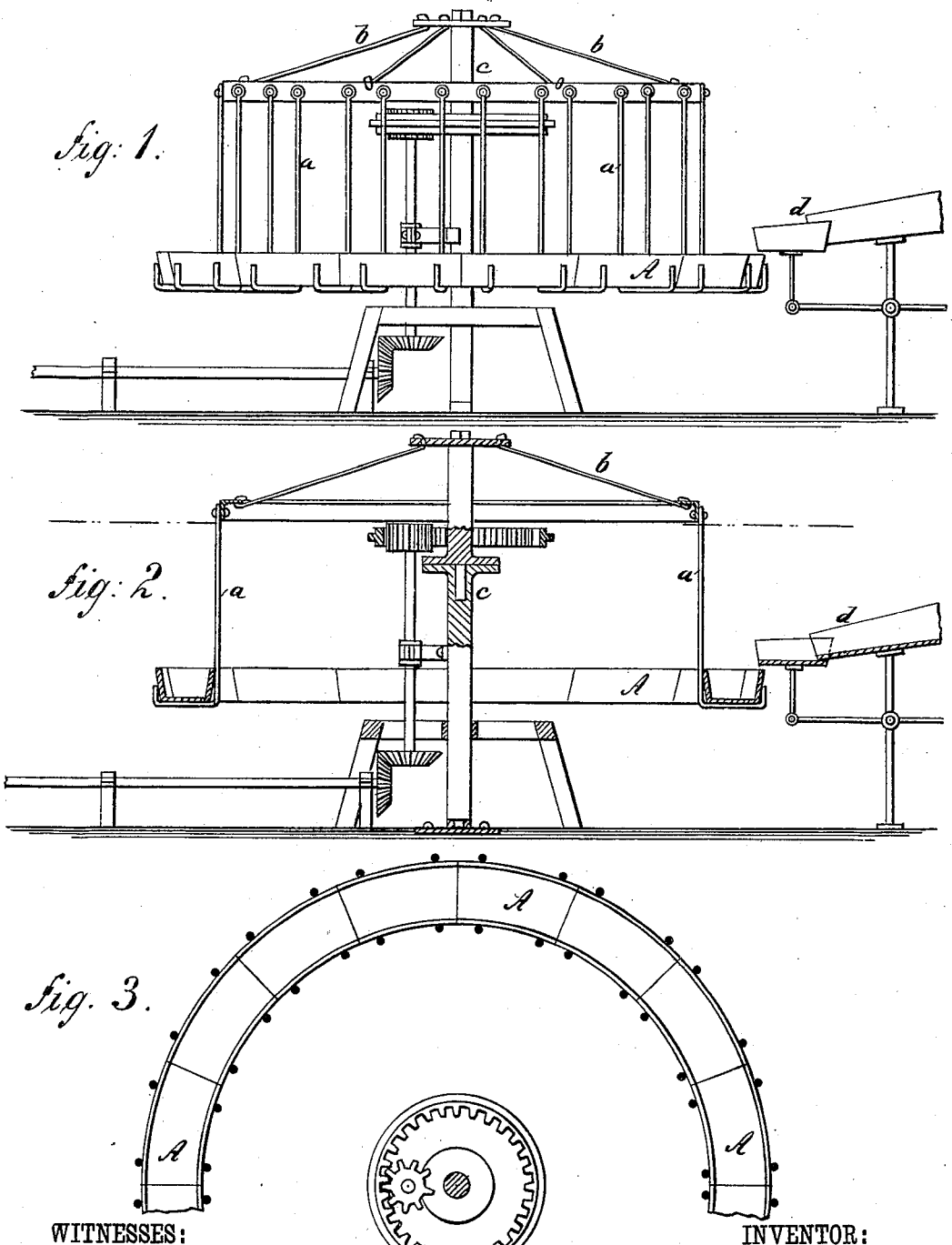

ALEXANDER D. ELBERS, OF HOBOKEN, NEW JERSEY.

TREATMENT OF FURNACE-SLAG.

SPECIFICATION forming part of Letters Patent No. 245,466, dated August 9, 1881.

Application filed March 26, 1881. (Model.)

*To all whom it may concern:*

Be it known that I, ALEXANDER D. ELBERS, of Hoboken, in the county of Hudson and State of New Jersey, have invented new and useful Improvements in the Treatment of Fluid Slag from Iron-Ore-Smelting or so-called "Blast" Furnaces, of which the following is a specification.

This invention has for its main object the rapid and cheap conversion of fluid slag and its solidification into such shapes as to materially increase its utilization.

Slag from the modern large furnaces, at which my invention could be carried out to greatest advantage, generally contains rather less than more of forty per cent. of silica. Its glassy or vitreous character is therefore not so pronounced as to insure, after solidification under ordinary treatment, such a state of vitrifaction and compactness as may be desirable. As slag is neither a compound especially concocted with a view to its ultimate form or usefulness nor of sufficient value to allow of expensive treatment, such as reheating and annealing, its conversion into rather primitive, but still sufficiently uniform, and suitable products for the utilization of large masses has to contend with the disturbing influences well known to all metal-founders—almost simultaneous shrinkage of the still liquid and irregular contraction in cooling of the solidified parts. Usually the slag is allowed to run from the furnace through gutters or along a chute, and as it runs on the ground into furrows it becomes quickly chilled on the surface, while from under the still liquid slag runs onward and breaks out in new streams, which, in their turn, become crusted over; or it is run into tubs or cars, allowed to cool therein, and then dumped on the cinder-banks. In either case the slag is liable to solidify into irregular, honey-combed, crumbling pieces, which disintegrate under exposure, and, if used on road-beds, occasion considerable dust. At best it assumes a somewhat denser and stone-like appearance; but even then has little strength or solidity. Aside from the influences of shrinkage and contraction aforementioned, these conditions are also owing to disturbance of vitrifaction, on account of the heat which is sent forth from the underlying and still liquid mass to the already solidified portion above it, because the same quality of slag may be made nearly as hard as flint-glass if it is suddenly chilled in small particles—as, for instance, the highly-vitrified globules which are formed during the conversion of liquid slag into so-called "mineral-wool."

By my improved method and apparatus the action of the liquid on the solidifying and solid parts is nearly reversed, as I now proceed to explain.

In the accompanying drawings, Figure 1 is a side elevation, Fig. 2 a vertical section, and Fig. 3 a horizontal section, of an apparatus embodying my invention.

Similar letters of reference indicate corresponding parts.

A is an annular trough or gutter of suitable width and size, sustained by hangers $a$ from spider-arms $b$, that are sustained on a post, $c$, and fitted for revolution by any suitable mechanism.

$d$ is a spout for supply of slag to trough A.

I allow the fluid slag to spread swiftly in the revolving gutter A, which, by preference, is made in adjustable sections and of iron or steel plates, into which it flows by a spout, $d$, which, by preference, is made movable, so as to direct the course of the flow.

The apparatus, to which the gutter A is fastened in any convenient manner, is best constructed in the form of a so-called "carrousel," which can be quickly turned, even by hand-power; and the necessary size of the apparatus depends on the quantity of slag which is to be run into the gutter A.

After the apparatus is set in motion the first layer of the slag, as it flows from the trough $d$ into the revolving gutter A, will almost instantly become chilled by contact cooling with the bottom and sides of the gutter, while the subsequent layers have to be mainly solidified by the rapid air-circulation on their surface. As the liquid slag unites or welds readily with the underlying already solidified, but still very hot slag, a satisfactory weld of all the layers as they accrue during rotation (the hotter strata always on top) is to be expected, as well as a comparatively uniform contraction of the united mass.

The material thus obtained by my new method is dense, comparatively proof against disintegration, similar in tenacity and compactness to hard-baked stoneware or pottery, more or less vitrified, and of glazed appearance where it has been in contact with the gutter surface or facings. As to its utilization, one of its most extensive applications may be for railroad-ballast under and between ties. If it is cast into the shape of gutters or troughs these may be used in culverts and in underground-telegraph and steam-heating constructions. As a material for jetties, dams, and similar work, where the filling in of a large volume at a minimum weight may be desirable, the slag can be run in small streams into the rapidly-revolving gutter, so as to form fasicular bulky masses of irregularly-shaped threads, highly vitrified, which may also be used for filtering-beds in water-reservoirs, &c.
The shape of the material may therefore be that of solid blocks, of slabs, sticks, hollows, or of any forms which can be obtained in the revolving gutter by indentations, projections, and other well-known contrivances which are used in casting and in removing casts. The gutter itself may consist of different and many pieces, which may be put together or taken out, as occasion may require; or several gutters alongside of each other, or arranged in such manner in the circumference of the apparatus as to receive the slag from a movable trough or from other channels, may be provided without affecting the result otherwise than in degree.

Having thus fully described my invention, I claim as new and desire to secure by Letters Patent—

The hereinbefore-described method of treating liquid slag, which consists in casting it in cumulative layers, substantially as specified.

ALEXANDER D. ELBERS.

Witnesses:
  GEO. D. WALKER,
  C. SEDGWICK.